INVENTOR.
C. H. PROPSTER JR.

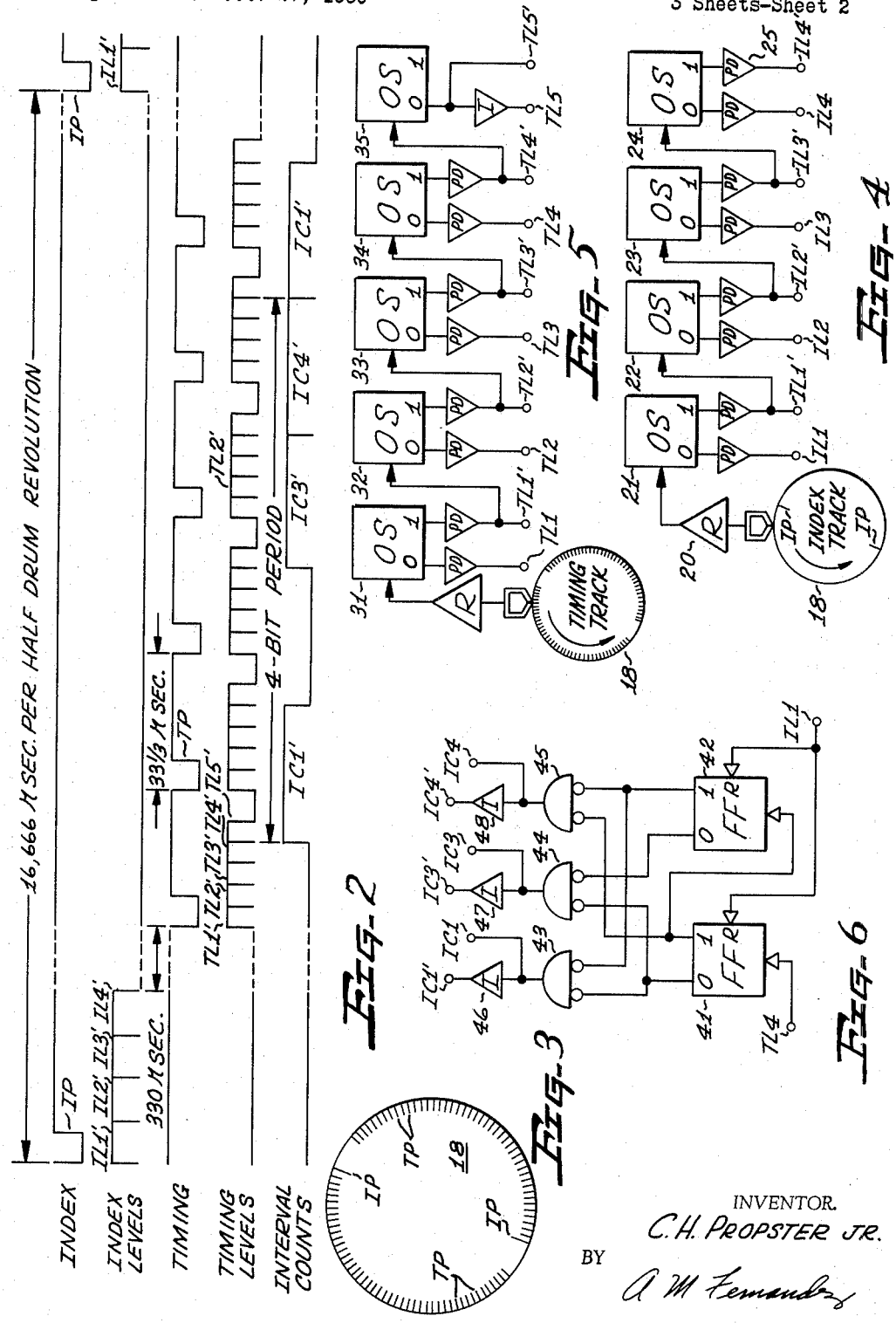

Oct. 26, 1965  C. H. PROPSTER, JR  3,214,576
MULTIPLE ACCUMULATORS
Original Filed Oct. 27, 1959  3 Sheets-Sheet 3

INVENTOR.
C. H. PROPSTER JR.
BY
ATTORNEY

United States Patent Office 3,214,576
Patented Oct. 26, 1965

3,214,576
MULTIPLE ACCUMULATORS
Charles H. Propster, Jr., San Jose, Calif., assignor to General Electric Company, a corporation of New York
Original application Oct. 27, 1959, Ser. No. 849,002, now Patent No. 3,093,730, dated June 11, 1963. Divided and this application June 25, 1962, Ser. No. 204,696
3 Claims. (Cl. 235—168)

This invention pertains to a system for providing a plurality of data accumulators on a magnetic drum or similar rotating magnetic medium.

The development of high speed inspection methods has created a need for a system for accumulating inspection data. For those manufacturing processes which require a large amount of inspection data to be accumulated, it is desirable to implement requisite components in an economical manner. For instance, in a system for accumulating inspection data from sensors disposed along an inspection line, means may be provided for translating information obtained in successive intervals of time on a given item as it travels along the inspection line and for accumulating such information during a given period.

It is an object of this invention to provide a novel and economical system for providing a plurality of accumulators.

It is a further object to provide a plurality of accumulators on a track of a rotating magnetic medium using a single control section on a time-sharing basis.

In one embodiment of the invention, inspection data from a plurality of sensors is accumulated and printed on a permanent record through a plurality of correlating channels, one channel for each different type of inspection data to be recorded. Certain channels include a shift register as a delay element to compensate for the distance the sensor is displaced from a reference point along the inspection line. A single rotating magnetic drum provides all of the binary storage required to implement the accumulators. Only a small amount of additional binary storage is necessary for the control circuits of the accumulators.

The additional binary storage is relatively small as only one control circuit is provided for all of the accumulators implemented on a track of a rotating magnetic drum. This economic use of control circuits is accomplished through a time-sharing technique made feasible by organizing the drum in halves or pairs of sectors such that two complete operating cycles are provided for each accumulator during each drum revolution. Data recorded in a given sector is read out in series and immediately re-recorded in corresponding cells of an associated sector on the other side of the drum. One-half of a drum cycle later, the data is re-read and transferred back to a given sector. Thus, the data is continually transferred between the sectors. Each time the data is transferred, it may undergo an accumulating operation; therefore, a system implemented in such a manner may perform as many as two accumulating operations during one drum cycle.

A source of synchronizing pulses is provided on the drum to time each drum operation within a given half cycle and another source of pulses controlled by some other means, such as the inspection line not shown, is provided to synchronize the rate at which accumulating operations are allowed to occur with the rate at which the inspection line is being operated. In the present embodiment, a modified tachometer driven by the inspection line is employed to generate one pulse for each item which passes a given inspection point. Accordingly, the second source of synchronizing pulses is referred to hereinafter as a TACH pulse source.

Other objects and inventions will become apparent from the following disclosure taken in conjunction with the accompanying drawings in which:

FIG. 2 is a timing diagram of synchronizing pulses;

FIG. 3 illustrates schematically the physical location of recorded timing pulses in each sector with respect to recorded index pulses which define the sectors;

FIGS. 4, 5 and 6 illustrate schematically the manner in which the synchronizing pulses of FIG. 2 may be obtained.

Figure 1:
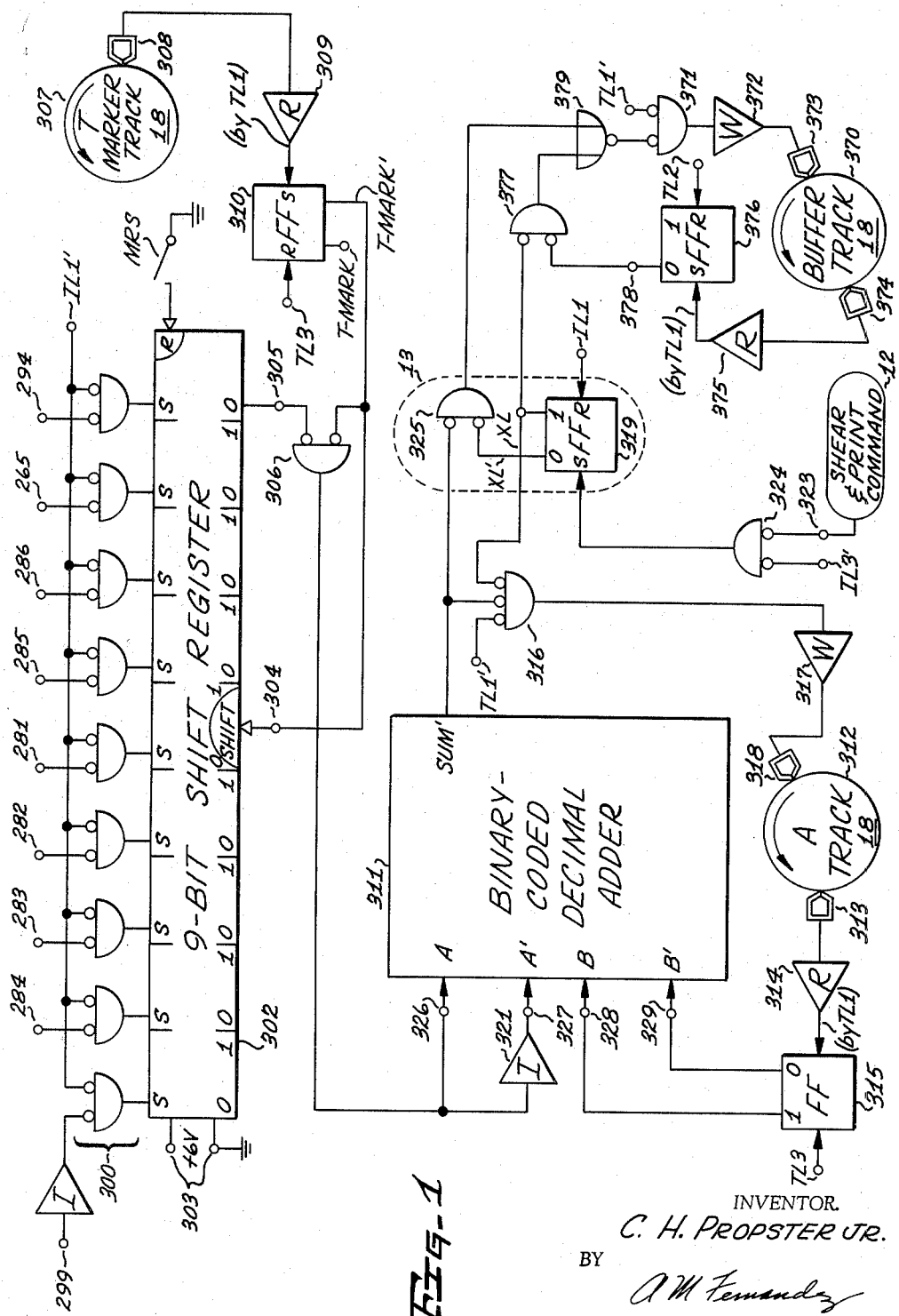
FIG. 1 is a schematic diagram of the accumulating and output buffer sections in a data accumulating system having a plurality of accumulators implemented on a track of a rotating magnetic medium.

For a detailed description of the complete data accumulating system of which this invention is a component part, reference is made to the co-pending application, Serial No. 849,002 filed October 27, 1959, from which the present application has been divided.

CIRCUIT ELEMENTS

Before proceeding with a detailed description of an embodiment of the invention, circuits which may be used to implement that embodiment will first be generally described. For a detailed description and diagrams of those circuits, reference is made to the aforementioned co-pending application. The basic module or building block from which almost all of the circuits of the invention may be constructed consists of a NOR-circuit comprising a common-emitter transistor amplifier that is useful not only as an inverter and as an active element in transistor monostable multivibrators or one-shots and bistable multivibrators or flip-flops but also to provide the logic AND and OR functions. The logic functions are provided with a NOR-circuit by coupling an input terminal to the base of the transistor by impedance elements so that only when both input signals are negative with respect to the emitter bias will the transistor amplifier conduct. If the emitter is connected to a bias source of +6 volts, a logic level of +6 volts for the output signals is established. That +6 volt level may be arbitrarily defined as a binary 0.

The collector of the transistor is connected to an output terminal which is clamped to ground by a diode so that a second logic level of 0 volts defined as a binary 1 is established. Accordingly, when two input signals A and B are both +6 volts, the signal at the output terminal is 0 volts. A Boolean equation for that logic AND function may be written as $A'B'=C$. Since the output of the NOR-circuit employed as an AND-gate is changed from a bit 0 to a bit 1 only in response to a +6 volt signal at both input terminals, to obtain the logic AND function of any set of signals X and Y, the binary complements $\overline{X}$ and $\overline{Y}$ are used as the input signals.

As noted hereinbefore, the NOR-circuit is also used as an OR-gate and as an inverter. For the logical OR function, both input terminals are normally at +6 volts to hold the transistor cut off; the output terminal is then normally at 0 volts. If either input terminal is driven to 0 volts, the transistor conducts at saturation and the potential of the output terminal is driven to +6 volts. Thus, the output of the OR-gate is changed from a bit 1 to a bit 0 in response to a bit 1 signal in either input terminal. The logic OR operation may be written as $A+B=\overline{C}$. Accordingly, the OR-gate operates on any set of signals X and Y to provide as an output signal a bit 0 if either X or Y is a bit 1. If only one input terminal is used, the logic element functions simply as an inverter.

A flip-flop may be implemented by cross-coupling the output terminals of two NOR-circuits with their input terminals. A one-shot circuit may be similarly implemented by using only a capacitor for the cross-coupling element from the output terminal of one NOR-circuit to the input terminal of the other.

It should be understood that these and other circuits employed, such as power-drivers, write amplifiers and read amplifiers, may be implemented with other conventional circuit configurations as long as it is understood that allowance should be made for the inherent inverting function of each NOR-circuit employed as either an AND-gate or an OR-gate if a logic gate of a circuit configuration not inherently providing inversion is employed.

In the drawings, the AND-gate is represented by a half circle having input terminals coupled to it by small circles which represent the inherent inverting function of the NOR-circuit when employed to provide the logic function $A'B'=C$. The OR-gate is represented by a half-circle having input terminals running through it and an output terminal coupled to it by a small circle which represents the inherent inverting function of the NOR-circuit when employed to provide the logic function $A+B=\overline{C}$. The other circuits are represented by block symbols bearing brief or abbreviated legends.

GENERAL DESCRIPTION

Three transducers or detectors (not shown) are provided for sensing defects in tinplate as it is inspected and wound into a coil by means also not shown. They are displaced from each other such that each inspects a different foot at a given time. Each defect, such as a pinhole, over-gauge or under-gauge, produces a pulse signal in a corresponding detector which is fed to a data input control circuit.

To coordinate all of the inspection data with respect to a given foot, the inspection data from each detector is so delayed in a delay section that all of the data pertaining to that given foot is fed to an accumulating section at the same time. The delay section consists of the data input control section and a plurality of drum shift register channels. Each drum shift register channel receives its corresponding data and transfers it through a plurality of binary storage cells, one cell at a time, in response to TACH pulses until the desired delay has been introduced.

The TACH pulse source may be a tachometer driven by the tinplate and modified to generate a pulse for each linear foot of tinplate that passes over it. Accordingly, the transfer of data through a drum shift register is controlled by TACH pulses and proceeds at the same rate that the tinplate is inspected. For instance, if the detectors are respectively twenty-five, twenty-three and seventeen feet away from a shearing station, and if the data from the detectors is transferred through corresponding shift register channels having twenty-five, twenty-three and seventeen cells, respectively, all of the data transferred out of the shift register channels at any given time must pertain to the same foot of tinplate and that particular foot will at that time have just passed the shearing station regardless of the tinplate speed.

Under normal operation, the tinplate is inspected at a relatively constant rate so that the TACH pulses are generated at a substantially constant rate. However, when the tinplate coil is separated from the line, the tinplate is decelerated, sheared and then accelerated by a control means not shown with the result that the TACH pulse repetition rate is first decreased and then increased to normal again. Since the delay introduced by each drum shift register channel is controlled by TACH pulses, the delay through each channel is in terms of feet of tinplate inspected and the fact that the speed of the tinplate varies is not important.

The accumulating section to which the coordinated data from the delay section is fed consists of an accumulator input control circuit and a plurality of drum accumulators, one accumulator for each type of data to be accumulated. The transfer of data from the drum shift register channels to the drum accumulators is accomplished through the data input control circuit and the accumulator input control circuit.

In transferring the inspection data from the delay section to the accumulating section, the coordinated data may be processed to develop other useful data to be accumulated. In the instant embodiment, all of the data pertaining to a given foot is processed by a logic circuit to determine whether any defects were detected. If there were none, a signal is developed indicating that the given foot is prime or first in quality. All of the prime-foot signals are accumulated in the same manner as other data to provide the total number of prime feet in the coil as part of the information record.

It may not be necessary to coordinate all of the data in certain applications. Data which does not need to be coordinated is transferred directly through the data input control circuit and the accumulator input control circuit. In the instant embodiment, the total number of feet inspected and the total number of pinholes detected in the coil are not coordinated. The total-feet data which is obtained by accumulating TACH pulses does not need to be coordinated since every foot of tinplate is the same for the purpose of obtaining total footage.

The total-pinhole data is obtained by first counting pinhole defect signals in the data input control circuit for each foot of tinplate inspected and then accumulating the pinhole count for every foot inspected. If an exact total pinhole count is desired for each coil, the pinhole count data should also be coordinated in the same manner as other inspection data.

When a shear command is received from a source external to the system, a transfer switch is actuated and all of the data in the drum accumulators is transferred to a buffer section which includes a drum buffer and a data print control section. The drum buffer stores the accumulated data pertaining to the coil just sheared from the line until the data print control section calls for it to be printed out, one digit at a time, at a rate determined by a printer.

The drum shift register channels, drum accumulators and drum buffer 14 are all implemented on a band of tracks on a magnetic drum so that only one source of synchronizing pulses is necessary for the proper timing of the operations in each section of the system. The source of synchronizing pulses is also implemented on the band of tracks in a conventional manner.

TIMING

FIG. 2 is a timing diagram of the synchronizing pulses. The first graph is of the negative-going (+6 to 0 volts) index pulses IP, two of which are oppositely written on a single track of the drum 18 (FIGS. 3 and 4) to separate it into two equal parts. Although in this embodiment the drum 18 is divided into only two equal parts, it should be understood that the drum may be organized into any number of equal parts, by simply providing additional index pulses. For instance, the drum could be separated into three equal parts. Data read from one part would immediately be written in the next part. One third of a drum cycle later, the data would be reread and rewritten in the third part. In that way three operations could be performed in one drum cycle.

The third graph is of the negative-going (+6 to 0 volts) timing pulses TP which are written on another track of the drum 18 (FIGS. 3 and 5). They separate each half of the drum between the index pulses into very small sectors, each sector constituting a single binary storage cell in a manner well known in the art. It should be noted from the graphs of FIG. 2 and from the diagram of FIG. 3 that a blank space is left between each index pulse IP and the first timing pulse TP following it. In the illustrated example that space is about 370 microseconds. The reason for it is to allow more than sufficient time for data to be transferred between sections of the system in synchronism with an index pulse before operations within the sections commence and to provide at least one blank timing pulse period 33⅓ microseconds). Thus, if desired, that blank space may be reduced to forty microseconds for the time needed to transfer data between sections plus one timing pulse period.

In order to precisely control the transfer of data between sections and to accurately time operations within a given section, several levels of indexing and timing are provided by four index level pulses, each ten microseconds long, and five timing level pulses, each five microseconds long.

The second graph of FIG. 2 is of the index level pulses derived from a circuit shown in FIG. 4 in response to an index pulse from a read amplifier 20. That circuit consists of four monostable multivibrators 21 to 24 cascade coupled through power-drivers 25. Each produces a ten microseconds pulse. Since the power-drivers function not only to provide sufficient power to drive a large number of logic circuits in parallel but also to invert the pulses, the IL1' to IL4' pulses shown in the second graph of FIG. 2 are actually derived from terminals coupled to the "true" or 1-output sides of the monostable multivibrators. Similarly, the true signals IL1 to IL4 are derived from terminals coupled to the "false" or 0-output sides of the monostable multivibrators.

In a similar manner the timing pulses TP generate the timing level pulses TL1' to TL5' as illustrated in the fourth graph of FIG. 2 through five cascaded monostable multivibrators 31 to 35 as shown in FIG. 5. As noted hereinbefore, each timing level pulse is five microseconds long.

The reason for designating the positive-going (0 to +6 volts) pulses with a prime, such as the IL1' and TL1' pulses, is that a voltage level of +6 volts is used to represent a bit 0 and a voltage level of 0 volts is used to represent a bit 1 in the logic of the system to be described. Accordingly, IL1' is to be read as *not* IL1 while *not* IL1', which should be written as IL1', is to be read as IL1. To avoid confusion, the double negative notation will not be used; instead, its corresponding positive notation is used. However, the inverted or "not" form of a signal obtained from the "false" side of the flip-flop or monostable multivibrator or from the "true" side through an inverter will very frequently be used.

The pulses in the last graph of FIG. 2 are derived from an interval counter schematically illustrated in FIG. 6. It consists of two cascaded binary circuits 41 and 42 which count the end of each TL4 pulse and which are reset by each IL1 pulse. The function of the interval counter is to separate the binary cells of each half of the drum into digit groups. Each digit group includes four timing periods, each period having a duration from the end of one TL4 pulse to the end of the next TL4 pulse. The number of periods in the group has been arbitrarily selected so that each group may store one four-bit binary-coded decimal digit. A signal corresponding to each of the interval count periods, IC1 to IC4, except the second, IC2, is obtained from a decoder consisting of three logic AND-gates 43, 44 and 45. Inverters 46, 47 and 48 connected to the output terminals of the AND-gates provide the IC1', IC3' and IC4' pulses of FIG. 2.

The sources of these index level, timing level and interval count pulses will not be referred to again. Instead, input terminals which are to be connected to particular ones of the output terminals of the circuits in FIGS. 4, 5 and 6 will be indicated by legends.

In addition to the index level and timing level synchronizing pulses, other control signals are obtained from other tracks on the drum. The manner in which those control signals are derived will be described hereinafter with reference to FIG. 1.

ACCUMULATING SECTION

General

An IL1' pulse gates the inspection data from the delay section (not shown) to the accumulating section illustrated in FIG. 1. Data transferred to the accumulating section is added during the following half drum cycle to data previously accumulated. For instance, a bit 1 denoting that a given type of defect was detected is added to a previous total in a given accumulator. In the instant embodiment, there are six data accumulators, one for the total pinhole count, one each for the total number of feet having one of three different types of defects, one for the total number of feet inspected and one for the total number of prime feet. The accumulating process is repetaed during each half cycle. However, each IL1' pulse gates only zero bits into the accumulator section except those IL1' pulses which follow a shift operation in the delay section because only then is there any data being stored in the output shift register and buffer flip-flops of that section.

Accumulator input control

The data from the delay section is gated to the accumulating section through a bank of AND-gates 300. The output terminals of the delay section are connected to the input terminals of the AND-gates 300 as follows: The total pinhole count to terminals 281 to 284; the delayed inspection data to terminals 285, 286 and 265; the bit 1 which represents that a foot of tinplate has been inspected to terminal 294; and the bit which denotes whether the foot to which the inspection data at terminals 285, 286 and 265 pertains is prime to terminal 299. The terminal 299 is coupled to one of the AND-gates 300 through an inverter 301 to obtain the complement of the prime-foot data since the logic AND-gate requires the complement or inverted form of the signals to be combined and the prime-foot data, unlike the rest of the inspection data, is not presented to the accumulator section of FIG. 1 in a complemented form.

Each of the output terminals of the AND-gates 300 is connected to a set input terminal of a different stage of a nine-bit shift register 302. A pair of serial-input terminals 303 are connected to a bit-0 source illustrated by a +6 volt signal source. Each pulse applied to the shift control terminal 304 of the shift register 302 advances the stored data one place to the right in order that each bit of the data transferred in parallel into the shift register may be read out serially through an output terminal 305. As each of the nine bits of data is serially read out, a bit 0 from the serial input terminals 300 is shifted into the shift register. Consequently, as data is serially shifted into the accumulators through an AND-gate 306 connected to the output terminal 305, the shift register is reset. A manually operated reset switch MRS connected to the reset input terminal of the shift register may be momentarily closed to initially reset the shift register.

The data serially read out through the output terminal 305 is gated through the AND-gate 306 by T-MARK' pulses which are generated in response to T-marker pulses recorded on a track 307 of the drum 18. Those pulses are read by a transducer 308 and translated by an amplifier 309 to a flip-flop 310 prior to the time of a TL1 pulse. In that way the flip-flop 310 is set by the time of the leading edge of a TL1 pulse and reset by the leading edge of a TL3 pulse applied to its reset input terminal.

The T-MARK' signals from the false output terminal of the flip-flop gates the signals from the output terminal 305 to a binary-coded decimal adder 311 time-shared by the drum accumulators. The T-MARK' pulses are also applied to the shift control terminal 304 of the shift register 302 but since the T-MARK' pulses are positive-going (0 to +6 volts), the data in the shift register is not advanced until the negative-going (+6 to 0 volts) trailing edges of the T-MARK' pulses are received since the shift register requires negative-going shift control signals. Accordingly, the serial output signal of the shift register is presented to the binary adder 311 from prior to the time of the leading edge of a TL1 pulse to the time of the leading edge of the next TL3 pulse. Then the flip-flop 310 is reset, the AND-gate 306 is disabled, and the data in the shift register is shifted one place to the right.

In the present embodiment, there are nine T-marker pulses recorded on the track 307, one for each of the nine bits in the shift register. The nine T-MARK' pulses T1 to T9 time or mark particular binary cells in an accumulator track 312. Those cells are the first cells of the six accumulators and the second, third and fourth cells of the fifth accumulator. The following chart graphically illustrates the timing of the T–MARK' pulses T1 to T9.

```
              First Accumulator
 ——→  1/ 0   0   0  /0 0 0 0 /0 0 0 0 /0 0 0 0
      T1         Second Accumulator
 ——→  /0  1   0   0  /0 0 0 0 /0 0 0 0 /0 0 0 0
      T2
              Third Accumulator
 ——→  /1  1   0   0  /0 0 0 0 /0 0 0 0 /0 0 0 0
      T3         Fourth Accumulator
 ——→  /0  0   1   0  /0 0 0 0 /0 0 0 0 /0 0 0 0
      T4
              Fifth Accumulator
 ——→  /0  0   0   1  /1 0 0 1 /1 0 1 0 /0 0 0 0
      T5 T6 T7 T8
              Sixth Accumulator
 ——→  /0  0   0   0  /0 0 0 0 /0 1 1 0 /0 0 0 0
      T9
```

In the foregoing chart, the cells of the six accumulators are graphically illustrated in separate lines, but on the drum they would be in one continuous line or track. Each cell is indicated by either a bit 0 or a bit 1. The cells are separated into groups of four by bars which, of course, are not present on the drum. In the present embodiment, the cells are actually grouped by the interval counter described with reference to FIG. 6. The interval-count signals derived therefrom are utilized in the binary adder 311 and the data print control circuit not shown to separate the bits sequentially read from cells on the drum into four-bit binary-coded decimal digits. For instance, the total pinhole count in the fifth accumulator is illustrated in the chart as 0598 in binary-coded decimal form. The least significant digit 8 is stored in the first four cells on the left of the fifth accumulator and the digit 0 in the most significant decimal order of that number is stored in the last four cells on the right. Of each group of four cells, the first cell on the left stores the least significant binary digit. The data is stored in the accumulator in that order so that the least significant bit of the least significant digit of each accumulator is always read first as the cells are scanned (from left to right in the chart). That is necessary because the binary adder must operate on the binary digits of each decimal digit and of the successive decimal digits in the order of their increasing significance in order that binary carries may be propagated within groups of four cells and decimal carries may be propagated between groups of four cells.

The function of each of the T-MARK' pulses T1 to T9 illustrated in the foregoing chart is to gate one binary digit from the shift register 302 to its appropriate accumulator. The first, second, third, fourth and sixth accumulators have only one T-MARK' pulse each since they accumulate only unitary binary digits. The fifth accumulator, however, has four T-MARK' pulses T5 to T8 since it accumulates the total number of pin-holes by adding four-bit binary-coded digits which represent the pinholes detected in successive feet of tinplate.

When the accumulated data is printed, in a manner not shown, the last digit of the sixth accumulator is read out, decoded and printed first because it is the most significant digit of that accumulator and it is desirable to print one digit at a time starting with the most significant digit of the last accumulator.

Drum accumulators

The memory portion of each of the accumulators consists of a pair of sectors oppositely disposed on the track 312. In the present embodiment, each sector consists of sixteen binary cells which are separated into groups of four by interval-count pulses as described hereinbefore.

Referring again to the foregoing chart, it may be seen that the sectors in one half of the track are arranged in sequence for the six accumulators. The last four cells of the sixth accumulator comprise the last group of four cells on that half of the track before an IL1 pulse resets the interval counter (FIG. 6). The second half of the accumulator track 312 is identical to the first half.

Data stored in a given half of the track is read sequentially by a transducer 313 and a read amplifier 314. A buffer flip-flop 315 stores each bit from the amplifier 314 until it is reset by a TL3 pulse. In the interim, a bit stored in the buffer flip-flop is translated by the binary-coded decimal adder to an input terminal of an AND-gate 316 where it is gated by a TL1' pulse to a write amplifier 317 which records the gated bit on the track 312 through a recording transducer 318. In that manner, the data is transferred from one side of the track to the other twice during each drum revolution cycle until a flip-flop 319 is set to transfer the accumulated data to the buffer section for printing. The true output terminal of the flip-flop 319 is connected to an input terminal of the AND-gate 316 so that when it is set, the AND-gate 316 is inhibited.

The flip-flop 319 is set by a shear signal received at a terminal 323 from a shear and print command source 12 through an AND-gate 324 when a given coil inspected is sheared from the line. An IL3' pulse gates the shear signal through the AND-gate 324 to set the flip-flop 319 at the beginning of a half drum cycle. All of the data read from the track 312 on one side of the drum is then transmitted to the buffer section through an AND-gate 325 which is enabled by a +6 volt signal from the false side of the flip-flop 319. The flip-flop is reset at the beginning of the next half cycle by an IL1 pulse so that accumulation of data from the next coil may begin immediately.

While the data read from a given half of the track 312 is being transmitted through the AND-gate 325 in the transfer switch 13, the data in the other half of the drum is being erased since the write amplifier 317 continually records a bit 0 except when it is triggered by a bit 1 transmitted through the AND-gate 316.

Data translated through the binary-coded decimal adder 311 is delayed therein four timing periods. Therefore, if the read head 313 were to be placed exactly opposite the write head, the data would be shifted or processed through four binary cells during each half drum revolution. Accordingly, the write head 318 is slipped ahead in the direction of rotation through an arc equal to binary cells so that it records a bit of data on the track 312 in a cell opposite to the cell read by the read head 313. In that manner, data read by the head 313 may be translated to the write head 318 through a four-bit shift register in the binary adder 311 and recorded without it precessing around the drum with respect to the index pulses.

Binary-coded decimal adder

Each bit gated through the AND-gate 306 is fed directly to an input terminal 326 of the binary-coded decimal adder 311. Each gated bit is also transmitted through an inverter 321 to an input terminal 327. Hereafter, data fed to the terminal 326 will be referred to as the addend A and the data fed to the terminal 327 will be referred to as the complement A' of the addend.

Each four bit binary-coded decimal digit read from the accumulator track 312 is fed to an input terminal 328 of the binary-coded decimal adder 311. The complement of each bit fed to that terminal is fed to another input terminal 329. Hereafter, data fed to the terminal 328 will be referred to as the augend B and the data fed to the terminal 329 will be referred to as the complement B' of the augend.

The output signal of the binary-coded decimal adder will be referred to as the sum, but it should be noted that each bit of the sum fed to the AND-gates 316 and 325 is the complement of the sum as denoted by the legend SUM'.

The manner in which the addend is added to the augend by the binary-coded decimal adder 311 to provide a binary-coded decimal sum will now be described with reference to FIG. 7. In general, the addend is in binary-coded form but since it consists of either a unitary bit or a four-bit binary-coded decimal digit, the addend is always a binary-coded decimal digit. The augend is also in binary-coded decimal form because each digit of the augend translated through the adder is a four-bit, binary-coded decimal digit and the sum is converted to a binary-coded decimal form by the adder. For instance, if two four-bit, binary-coded decimal digits are added in the conventional binary manner, the sum may exceed nine, as when a seven is added to an eight to produce a four-bit binary-coded sum of fifteen which has no meaning in a binary-coded decimal system. When that occurs, the sum is converted to the decimal system by first inserting a carry in the augend's next higher order and then subtracting a binary ten from the forbidden sum, thereby obtaining the binary-coded decimal sum. A ten can be subtracted from the forbidden sum of fifteen by adding to it a binary six and ignoring the carry.

An example will clarify the foregoing converting process. Assume that the augend is 0598 and that the addend is seven. The conventional binary addition is as follows:

```
Carry (0)  0000   0000   0000   000
Augend     0000   0101   1001   1000
Addend                          0111
           ────   ────   ────   ────
P-Sum      0000   0101   1001   1111
```

The preliminary sum (P-Sum) of the addend and the least significant digit of the augend is a binary-coded fifteen, which is a forbidden sum. To convert the preliminary sum when the forbidden sum is detected, a carry may be inserted into the binary-coded nine of the next four binary digits and a six added to the binary-coded fifteen of the first four binary digits as folows:

```
Carry (0)  0000   0000   0001   110
P-Sum      0000   0101   1001   1111
Six                             0110
           ────   ────   ────   ────
C-Sum      0000   0101   1010   0101
```

In the corrected sum (C-Sum), the least significant digit has been corrected to a five and a carry inserted in the next most significant binary-coded decimal digit, thereby increasing it from nine to ten which in a binary-coded decimal system, is also forbidden and again has no meaning. That the second digit has also exceeded nine may be detected and the process of converting the second four-bit binary-coded digit in the next order may be accomplished as follows:

```
Carry (0)  0000   0011   110
C-Sum      0000   0101   1010   0101
Six                     0110
           ────   ────   ────   ────
Sum        0000   0110   0000   0101
```

In converting the second digit, the least significant digit 5 is not involved since it has already been stored but it has been written again to complete the final sum of 0605.

Figure 7:
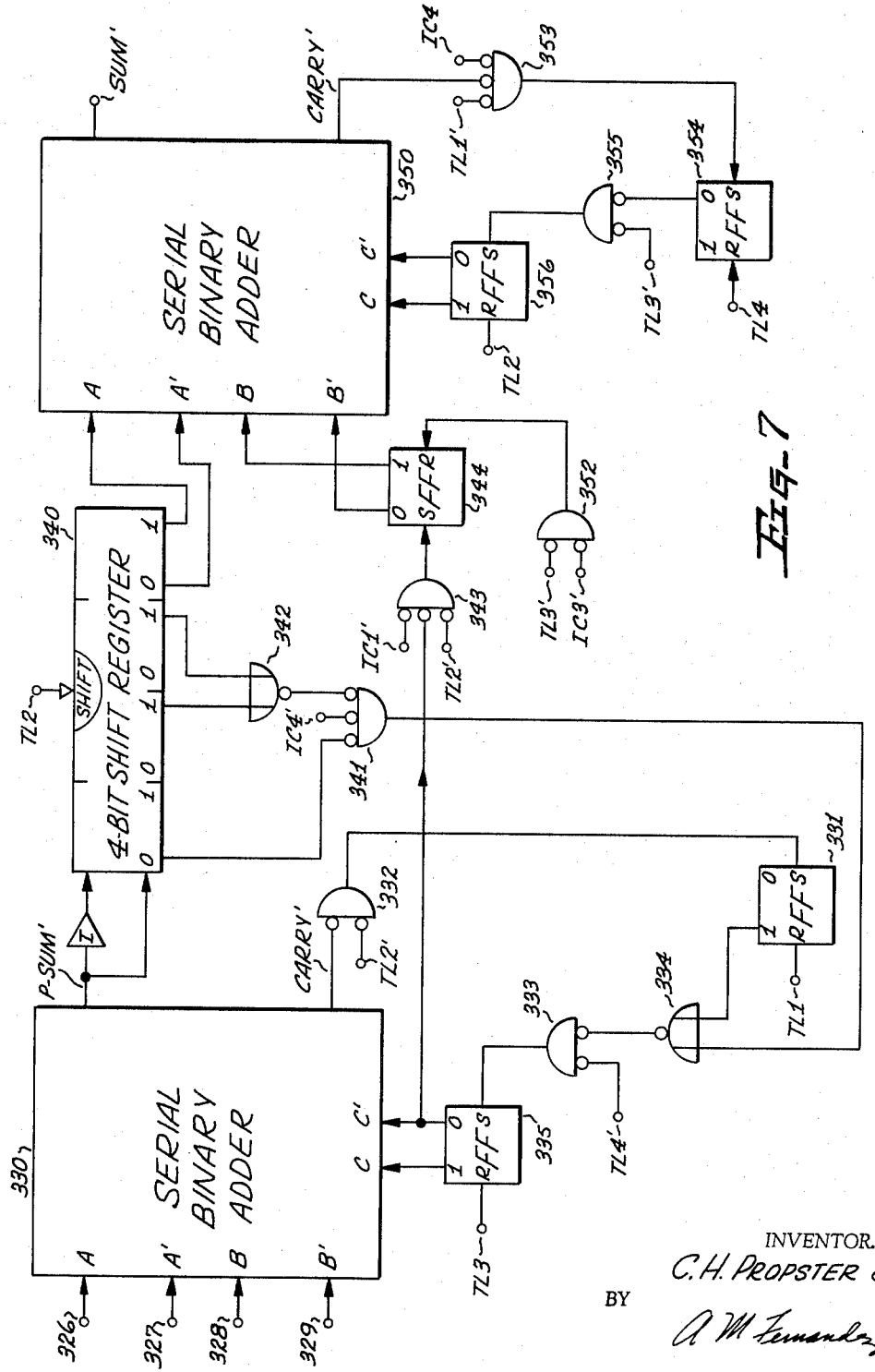
FIG. 7 is a schematic diagram of a binary-coded decimal adder.

It should be noted that in the foregoing example the least significant bit of each binary-coded digit has been placed on the right and that a serial adder has been employed so that the binary-coded digits may be added and converted to the binary-coded decimal system in sequence In the binary-coded decimal adder illustrated in FIG. 7, the addend serially presented at terminals 326 and 327 is serially added to the augend serially presented at terminals 328 and 329. The complement of the final sum is then serially presented at an output terminal indicated by the legend SUM'.

The implementation of the binary-coded decimal adder is illustrated in FIG. 6. It includes a first conventional full adder 330 to develop the sum of the addend and the augend, bit-by-bit, and to develop a carry signal whenever any two of the three input signals A, A'; B, B'; and C, C' are equal to a bit 1. A complement of the carry signal is gated by a TL2' to a buffer flip-flop 331 through an AND-gate 332. The output signal of the flip-flop 331 is transmitted to an AND-gate 333 through an OR-gate 334 until a TL1 pulse resets the flip-flop 331. A TL4' pulse gates the carry signal to a flip-flop 335 which then generates both a carry signal C and its complement C' until a TL3 pulse resets it.

The sum developed by the binary adder 330 is serially shifted into a four-bit shift register 340. Four successive TL2 pulses are therefore fed to its shift input terminal in order to shift the four-bit binary-coded sum into the shift register.

As noted hereinbefore, the sum from the binary adder 330 may exceed nine. Consequently, it is necessary to detect when a digit of the sum is any of the forbidden sums from ten to fifteen. A clocked AND-gate 341 is provided for that purpose. An IC4' clock pulse is required at one of its input terminals to insure than an output signal is not transmitted except when the four-bit sum to be checked has been properly stored in the shift register.

If a forbidden sum is present in the four-bit shift register during an IC4 interval, a TL4' pulse gates a signal through the AND-gate 333 to set the carry flip-flop 335, thereby inserting a bit 1 carry to be added to the next four-bit binary-coded decimal digit of the augend. The decoding logic to determine when there is a forbidden sum stored in the shift register 340 consists of a connection from the false side of the first stage to the AND-gate 341 and connections from the true sides of the second and third stages to a third input terminal of the AND-gate 341 through an OR-gate 342.

In that manner, a detected forbidden sum is partially corrected because a bit 1 carry has been inserted in the digit of the next higher decimal order. To complete the correction, a six must be added to the detected forbidden sum. This is accomplished by gating the complement of the carry signal from the flip-flop 335 through an AND-gate 343 with a TL2' pulse during the next IC1' interval to set a flip-flop 344. It should be noted that whereas all carries propagated by the first binary adder 330 set the carry flip-flop 335, it is only when the carry flip-flop 335 is set during an IC4 period that a carry signal C' is gated at the flip-flop 344 to add a six to the forbidden sum.

By the time the flip-flop 344 is set, the first bit of the forbidden sum will have been transmitted through a second binary adder 350 without alteration. In effect then, a bit 0 is added to the first bit fed to the binary adder 350 from the shift register 340. By the time the second bit of the forbidden sum is fed to the binary adder, the flip-flop 344 is set and a bit 1 is added to that second bit. The flip-flop 344 is not reset until a TL3' pulse gates an IC3' signal through an AND-gate 352. Therefore, a bit 1 is added to the third bit of the forbidden sum fed to the binary adder. The fourth bit of the forbidden sum is then fed to the binary adder after the flip-flop 344 is reset. Accordingly, the fourth bit is translated through the adder without alteration unless a carry signal was propagated by the binary adder 350 as a result of a bit being added to the third bit of the forbidden sum. In that manner a binary-coded six (0110) is added to the forbidden sum in order to subtract a ten and thereby correct the sum as explained hereinbefore.

Each carry propagated by the second binary adder 350 is gated through an AND-gate 353 by a TL1' pulse except during the IC4 count interval. During that interval, a 0 volt signal is present at a third input terminal of the AND-gate 353 which inhibits it from transmitting the carry signal being propagated from the most significant bit order of one digit to the least signifiicant bit order of the next digit when a six is added to correct a forbidden sum detected in the shift register.

Each carry signal gated by a TL1' pulse through the AND-gate 353 sets a buffer flip-flop 354. A TL3' pulse then gates the buffer output through an AND-gate 355 to set a carry flip-flop 356. Afterwards, a TL4 pulse resets the buffer flip-flop 354 and the following TL2 pulse resets the carry flip-flop 356 to clear the carry signal.

If the sum of two digits is sixteen, seventeen or eighteen, only part of the forbidden sum is stored in the shift register, the other part being a carry propagated during an IC4 interval when the most significant bits of the addend and augend are added in the first binary adder 330. The part that is stored in the shift register will be equal to either zero, one or two depending upon whether the sum is sixteen, seventeen or eighteen. None of those parts appear as forbidden sums; instead, they appear as proper binary-coded decimal digits. Therefore, the decoding AND-gate 341 will not initiate the addition of six necessary to correct the second part of a forbidden sum stored in the shift register. However, the forbidden sum will nevertheless be automatically corrected because the carry propagated by the addition of the most significant bits in the first binary adder 330 is gated from the carry flip-flop 335 through the AND-gate 343 by a TL2' pulse during the next IC1' interval to initiate the addition of six in the second binary adder 350. Correction of each of the forbidden sums sixteen, seventeen and eighteen is then accomplished by the addition of six to the part stored in the shift register in order to obtain the sum of six, seven and eight, respectively. The other part of the correcting process, namely the propagation of a carry to the next higher decimal order is accomplished by adding the carry signal output of the flip-flop 355 to the first bit of the digit in the next higher order.

*Binary adder*

The serial binary adders 330 and 350 may be of any conventional configuration designed in accordance with the teachings of R. K. Richards in Arithmetic Operations in Digital Computers, published by D. Van Nostrand Co. in 1955.

BUFFER SECTION

As noted hereinbefore with referenec to FIG. 1, data is accumulated in the accumulator section until a shear command is received. During a following complete half drum cycle, all of the data is transferred to a drum buffer where it is stored until it is needed by the printer 16 for the preparation of a permanent record.

*Drum buffer*

The manner in which the drum buffer is implemented is illustrated in FIG. 1. It consists of a plurality of sectors arranged in pairs around the drum 18 on a track 370 in the same manner as the accumulator sectors on the track 302. When the transfer flip-flop 319 in the transfer switch 12 is set by the coincidence of a shear signal and an IL3' pulse at the AND-gate 324, the AND-gate 316 is disabled. The AND-gate 325 is then enabled to transmit the data from the added 311 to the buffer track 370 during the next half cycle, after which the flip-flop 319 is reset by an IL1 pulse and the accumulation of new data from the next coil inspected begins in the accumulating section.

Each bit of data from the AND-gate 325 is gated by a TL1' pulse through an AND-gate 371 to a write amplifier 372 and its associated recording transducer 373. Since the transfer of data will always start at the beginning of a half drum cycle, it is completed in one half of a drum cycle. During the next half drum cycle, the transferred data recorded on one half of the buffer track 370 is read by a transducer 374 and amplifier 375.

Each bit of data read is stored in a buffer flip-flop 376 from a time prior to a TL1' pulse until a TL2 pulse resets it. The complement of each bit stored in the buffer flip-flop is transmitted through an AND-gate 377 which is connected to an output terminal 378 of the flip-flop 376 and enabled by the true side of the flip-flop 319 which has been reset by an IL1 pulse at the beginning of the next cycle. The output signals from the AND-gate 377 are transmitted through an OR-gate 379 to the AND-gate 371 and gated by TL1' pulses to the write amplifier 372. Once the accumulated data has been transferred to the buffer track 370, the accumulation of data on the track 312 may be resumed while data in the buffer track 370 is printed out by means not shown.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirement, without departing from those principles. The appended claims are therefore intended to cover and embrace any such modifications, within the limits only of the true spirit and scope of the invention.

What is claimed is:

1. A plurality of cyclically operated accumulators comprising:
    a memory track on a rotating magnetic medium divided into parts, each of said parts being further subdivided into an equal number of sectors having a given number of binary cells for storing a binary-coded augend;
    a source of marker pulses synchronized with said sectors;
    a shift register for receiving a plurality of binary-coded addend digits, at least one addend digit for each sector in one part of said memory track;
    a source of index pulses synchronized with said parts divided from said memory track on a rotating magnetic medium;
    a gating means responsive to said index pulses for transferring a plurality of binary-coded addend digits into said shift register;
    an adder;
    means for reading said augend digits from said memory track and for serially translating said augend digits to said adding means;
    means for coupling said marker pulses to a shift control terminal of said shift register to cause said addend digits to be serially translated to said adder; and
    means connected to an output terminal of said adder for recording the sums of said augends and corresponding addends in respective sectors of another part of said memory track.

2. In a system for accumulating data from a plurality of sources in a plurality of accumulators, each accumulator being implemented on a rotating magnetic medium having means for generating index, marker and timing signals, the combination comprising:
    a track on said rotating magnetic medium divided into a plurality of equal parts by said index signals, each part being further subdivided into a plurality of sectors by said marker signals, one sector for each accumulator, and each sector being separated into a plurality of binary cells by said timing signals;
    reading means for rendering stored data in each of said sectors of a given part sequentially available for transfer at least once during every cycle of rotation of said magnetic medium;

an adder adapted to receive said stored data directly from said reading means and to receive data to be accumulated from said plurality of sources through a shift register, said shift register having a plurality of parallel input terminals, a serial output terminal and a shift control terminal;

means responsive to said index signals for gating data in parallel into said shift register through its parallel input terminals;

a gating means coupling said serial output terminal of said shift register to said adder;

means for translating said marker signals to said gating means and to said shift control terminal of said shift register, whereby said means enables said gating means to transmit data to said adder as data in said shift register is serially shifted in response to said marker signals; and recording means connected to an output terminal of said adder for recording a sum in a sector of another part of said track.

3. In a data accumulating system having a plurality of accumulating registers implemented with a cyclic memory device having a plurality of temporal sectors sequentially available, each sector having a plurality of binary cells for storing a four-bit, binary-coded decimal augend, the combination comprising:

a source of four-bit, binary-coded decimal addends;

a first binary adder;

a first means for translating an augend from a given accumulator register to said first binary adder;

a source of marker pulses synchronized with said accumulator registers;

a second means responsive to a given marker pulse for translating a given addend digit to said first binary adder;

a third means coupled to said first binary adder for translating a decimal carry to said first adder for addition to the augend digit of higher decimal order as said given augend is translated thereto, said decimal carry being propagated for translation to said first binary adder when the binary addition of said given addend digit with an augend digit is greater than fifteen;

a second binary adder;

a register coupled to said first and second adders for translating a preliminary sum from said first binary adder to said second binary adder;

a fourth means coupled to said register for detecting the preliminary sum of a given addend digit to an augend digit greater than nine, but less than sixteen, and for propagating in response thereto a decimal carry to said first binary adder for addition to the augend digit of higher decimal order as said given augend is translated thereto;

a fifth means responsive to a decimal carry translated by said third means and to a decimal carry propagated by said fourth means for adding a binary-coded decimal six to said preliminary sum in said second binary adder to produce a final sum;

means connected to said second binary adder for inhibiting the propagation of any decimal carries therefrom; and means for storing said final sum in said given accumulator register.

References Cited by the Examiner

UNITED STATES PATENTS 3,004,706  10/61  Yandell _____ 235—170

ROBERT C. BAILEY, *Primary Examiner.*

MALCOLM A. MORRISON, *Examiner.*